US008959402B2

(12) United States Patent
Giddi (10) Patent No.: US 8,959,402 B2
(45) Date of Patent: Feb. 17, 2015

(54) METHOD FOR PREEMPTIVELY RESTARTING SOFTWARE IN A MULTI-SUBSYSTEM MOBILE COMMUNICATION DEVICE TO INCREASE MEAN TIME BETWEEN FAILURES (71) Applicant: QUALCOMM Incorporated, San Diego, CA (US)

(72) Inventor: Phani Babu Giddi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 13/644,335

(22) Filed: Oct. 4, 2012

(65) Prior Publication Data
US 2014/0101419 A1 Apr. 10, 2014

(51) Int. Cl.
G06F 11/00 (2006.01)

(52) U.S. Cl.
USPC .......................................... 714/47.3; 714/47.2

(58) Field of Classification Search
CPC  G06F 11/004; G06F 11/0793; G06F 11/3409
USPC .................................. 714/23, 47.1, 47.2, 47.3
See application file for complete search history.

(56) References Cited

U.S. PATENT DOCUMENTS

| 4,648,031 | A |   | 3/1987  | Jenner               |
| 5,398,233 | A | * | 3/1995  | Balmer et al. ............. 370/250 |
| 5,715,386 | A | * | 2/1998  | Fulton et al. ............. 714/38.12 |
| 5,914,874 | A | * | 6/1999  | Nohara ..................... 700/79 |
| 6,820,215 | B2 | * | 11/2004 | Harper et al. ............. 714/15 |
| 7,134,050 | B2 | * | 11/2006 | Wenzel ..................... 714/38.13 |
| 7,543,192 | B2 | * | 6/2009  | Vaidyanathan et al. ..... 714/47.2 |
| 7,702,966 | B2 | * | 4/2010  | Chandwani et al. ......... 714/47.1 |
| 7,953,808 | B2 | * | 5/2011  | Sharp et al. ................ 709/206 |
| 2003/0005426 | A1 |   | 1/2003  | Scholtens et al. |
| 2003/0191829 | A1 | * | 10/2003 | Masters et al. ............ 709/223 |

(Continued)

FOREIGN PATENT DOCUMENTS

| JP | 2002169788 A | 6/2002 |
| JP | 2002318643 A | 10/2002 |

OTHER PUBLICATIONS

Symantec ApplicationHA Users Guide AIX on IBM PowerVM, Dec. 2011, Symantec, Product version 6.0, pp. 44-47.*

(Continued)

Primary Examiner — Scott Baderman
Assistant Examiner — Paul F. Contino
(74) Attorney, Agent, or Firm — Nicholas A. Cole (57) ABSTRACT Methods for a mobile device restarting subsystem software on a schedule that reduces the likelihood of subsystem failures without requiring a general system restart or impacting other subsystems. The mobile device may calculate a restart time window during which a first subsystem may be restarted efficiently and prior to the occurrence of software failures. Upon initialization of the first subsystem, a restart timer may be established which indicates the period since a previous restart of the first subsystem. Once the restart timer indicates a time within the restart time window, the mobile device may transmit request messages to other subsystems dependent upon the first subsystem. In response to a unanimous vote by the other subsystems or the restart timer exceeding the time restart window, the mobile device may restart the first subsystem. In an aspect, the mobile device may transmit the request messages at an increasing rate.

32 Claims, 6 Drawing Sheets

(56) References Cited

U.S. PATENT DOCUMENTS

| | | | |
|---|---|---|---|
| 2006/0130044 A1* | 6/2006 | Avritzer et al. | 717/168 |
| 2007/0083794 A1 | 4/2007 | Yu et al. | |
| 2009/0083747 A1 | 3/2009 | Huang et al. | |
| 2010/0042820 A1* | 2/2010 | Clemm et al. | 713/2 |
| 2011/0072254 A1* | 3/2011 | Kuang et al. | 713/2 |
| 2011/0185161 A1 | 7/2011 | Chen | |
| 2011/0202797 A1 | 8/2011 | Mezhibovsky et al. | |

OTHER PUBLICATIONS

International Search Report and Written Opinion—PCT/US2013/058091—ISA/EPO—Feb. 6, 2014.

* cited by examiner

METHOD FOR PREEMPTIVELY RESTARTING SOFTWARE IN A MULTI-SUBSYSTEM MOBILE COMMUNICATION DEVICE TO INCREASE MEAN TIME BETWEEN FAILURES

BACKGROUND

Modern mobile communication devices are often built around a multi-subsystem system-on-chip (or "SOC"), with each subsystem performing a specific task, such as audio, video, peripheral interfacing, modem, communication, global positioning system (or "GPS"), etc. Each of the subsystems may be designed to service specialized hardware elements for accelerated processing and may communicate over a high performance inter-processor communication bus to perform various tasks. For example, the subsystems may communicate to accomplish tasks such as voice calls, video streaming, audio playback, etc. While performing such tasks, one or more subsystems in the system-on-chip may be active at a given time.

Reliability of the subsystems in a multi-subsystem system-on-chip may be evaluated based on the Mean Time Between Failure (or "MTBF") metric, which is defined as the arithmetic mean time between system failures. For example, over a period of time, a calculated Mean Time Between Failure metric may describe the average time in between crashes of a particular subsystem. In general, a subsystem may experience more reliable performance the longer the time between system failures. In other words, the higher the Mean Time Between Failure, the better the subsystem performance. When a subsystem starts experiencing failures, the subsystem performance may degrade, followed by a loss of service until the subsystem is restarted. Such failures are highly undesirable from a user's point of view.

The age (or the elapsed time since activation) of active software may impact subsystem reliability, and the Mean Time Between Failure may be inversely proportional to the age of the software executing on (or associated with) a subsystem. Software reliability and/or performance degradation over time, or "software aging," may account for many common subsystem failures. Such software aging may be the result of adverse software operating conditions, including memory fragmentation, memory leaks, overflow or underflow of counters, data corruption, and poor garbage collection. For example, in non-optimized subsystem software, memory may be allocated but not released after use, causing a cumulative lack of available memory for various subsystem operations. Further, many subsystem failures may occur when subsystem software is not restarted after a period of consistent use. This is a particular problem for mobile devices (e.g., smartphones, tablets, laptops, etc.), as these devices typically are rarely restarted. For example, many mobile devices may only be rebooted when users travel in commercial airplanes and/or during firmware upgrades.

SUMMARY

The various aspects may disclose methods and devices for improving reliability (i.e., increasing Mean Time Between Failure) of a first subsystem executing on a multi-subsystem mobile device. An aspect method may include calculating a minimum time and a maximum time at which software associated with the first subsystem should be restarted, identifying other subsystems that are dependent on the first subsystem, transmitting request messages to each dependent subsystem after the minimum time has elapsed and before the maximum time has elapsed, wherein the request messages prompt each dependent subsystem to vote on whether a restart of the software associated with the first subsystem may occur, restarting the software associated with the first subsystem when each dependent subsystem votes that the restart may occur, and restarting the software associated with the first subsystem when the maximum time at which the software associated with the first subsystem should be restarted has elapsed. In an aspect, the method may further include informing each dependent subsystem of a time and a duration of the restart of the software associated with the first subsystem, and informing each dependent subsystem when restarting the software associated with the first subsystem has completed. In an aspect, calculating a minimum time and a maximum time at which the software associated with the first subsystem should be restarted may include calculating the minimum time and the maximum time based on stored data describing at least one of previous subsystem software failures, subsystem software age information, dependency list subsystems identities, defect rates, and utilized resources of the first subsystem. In an aspect, the method may further include storing the calculated minimum time and the calculated maximum time within the mobile device, and the calculated minimum time and the calculated maximum time may be pre-determined based on historical data. In an aspect, the method may further include periodically retransmitting request messages to each dependent subsystem after the minimum time has elapsed so long as a dependent subsystem votes that the restart should not occur until the maximum time has elapsed. In an aspect, the method may further include calculating an interval for periodically retransmitting request messages to each dependent subsystem. In an aspect, the method may further include decreasing the interval for periodically retransmitting request messages based on time remaining before the maximum time at which the software associated with the first subsystem should be restarted. In an aspect, the method may further include storing the calculated interval for periodically retransmitting request messages within the mobile device, and the interval for periodically retransmitting request messages may be pre-determined based on historical data.

Another aspect may include a multi-subsystem mobile device that may include means for calculating a minimum time and a maximum time at which software associated with a first subsystem should be restarted, means for identifying other subsystems that are dependent on the first subsystem, means for transmitting request messages to each dependent subsystem after the minimum time has elapsed and before the maximum time has elapsed, wherein the request messages prompt each dependent subsystem to vote on whether a restart of the software associated with the first subsystem may occur, means for restarting the software associated with the first subsystem when each dependent subsystem votes that the restart may occur, and means for restarting the software associated with the first subsystem when the maximum time at which the software associated with the first subsystem should be restarted has elapsed. In an aspect, the mobile device may further include means for informing each dependent subsystem of a time and a duration of the restart of the software associated with the first subsystem, and means for informing each dependent subsystem when restarting the software associated with the first subsystem has completed. In an aspect, means for calculating a minimum time and a maximum time at which the software associated with the first subsystem should be restarted may include means for calculating the minimum time and the maximum time based on stored data describing at least one of previous subsystem software failures, subsystem software age information, dependency list subsystems identities, defect rates, and utilized resources of the first subsystem. In an aspect, the mobile device may further include means for storing the calculated minimum time and the calculated maximum time within the mobile device, and the calculated minimum time and the calculated maximum time may be pre-determined based on historical data. In an aspect, the mobile device may further include means for periodically retransmitting request messages to each dependent subsystem after the minimum time has elapsed so long as a dependent subsystem votes that the restart should not occur until the maximum time has elapsed. In an aspect, the mobile device may further include means for calculating an interval for periodically retransmitting request messages to each dependent subsystem. In an asepct, the mobile device may further include means for decreasing the interval for periodically retransmitting request messages based on time remaining before the maximum time at which the software associated with the first subsystem should be restarted. In an aspect, the mobile device may further include means for storing the calculated interval for periodically retransmitting request messages within the mobile device, and the interval for periodically retransmitting request messages may be pre-determined based on historical data.

In another aspect, a multi-subsystem mobile device may include a memory, and a processor coupled to the memory, and the processor may be configured with processor-executable instructions to perform operations that may include calculating a minimum time and a maximum time at which software associated with a first subsystem should be restarted, identifying other subsystems that are dependent on the first subsystem, transmitting request messages to each dependent subsystem after the minimum time has elapsed and before the maximum time has elapsed, wherein the request messages prompt each dependent subsystem to vote on whether a restart of the software associated with the first subsystem may occur, restarting the software associated with the first subsystem when each dependent subsystem votes that the restart may occur, and restarting the software associated with the first subsystem when the maximum time at which the software associated with the first subsystem should be restarted has elapsed. In an aspect, the processor may be configured with processor-executable instructions to perform operations that may further include informing each dependent subsystem of a time and a duration of the restart of the software associated with the first subsystem, and informing each dependent subsystem when restarting the software associated with the first subsystem has completed. In an aspect, the processor may be configured with processor-executable instructions to perform operations such that calculating a minimum time and a maximum time at which the software associated with the first subsystem should be restarted may include calculating the minimum time and the maximum time based on stored data describing at least one of previous subsystem software failures, subsystem software age information, dependency list subsystems identities, defect rates, and utilized resources of the first subsystem. In an aspect, the processor may be configured with processor-executable instructions to perform operations that may further include storing the calculated minimum time and the calculated maximum time within the mobile device, and the calculated minimum time and the calculated maximum time may be pre-determined based on historical data. In an aspect, the processor may be configured with processor-executable instructions to perform operations that may further include periodically retransmitting request messages to each dependent subsystem after the minimum time has elapsed so long as a dependent subsystem votes that the restart should not occur until the maximum time has elapsed. In an aspect, the processor may be configured with processor-executable instructions to perform operations that may further include calculating an interval for periodically retransmitting request messages to each dependent subsystem. In an aspect, the processor may be configured with processor-executable instructions to perform operations that may further include decreasing the interval for periodically retransmitting request messages based on time remaining before the maximum time at which the software associated with the first subsystem should be restarted. In an aspect, the processor may be configured with processor-executable instructions to perform operations that may further include storing the calculated interval for periodically retransmitting request messages within the mobile device, and the interval for periodically retransmitting request messages may be pre-determined based on historical data.

Another aspect may include a non-transitory processor-readable storage medium having stored thereon processor-executable software instructions configured to cause a processor to perform operations for improving reliability of a first subsystem executing on a multi-subsystem mobile device, and the operations may include calculating a minimum time and a maximum time at which software associated with the first subsystem should be restarted, identifying other subsystems that are dependent on the first subsystem, transmitting request messages to each dependent subsystem after the minimum time has elapsed and before the maximum time has elapsed, wherein the request messages prompt each dependent subsystem to vote on whether a restart of the software associated with the first subsystem may occur, restarting the software associated with the first subsystem when each dependent subsystem votes that the restart may occur, and restarting the software associated with the first subsystem when the maximum time at which the software associated with the first subsystem should be restarted has elapsed. In an aspect, the stored processor-executable software instructions may be configured to cause the processor to perform operations that may further include informing each dependent subsystem of a time and a duration of the restart of the software associated with the first subsystem, and informing each dependent subsystem when restarting the software associated with the first subsystem has completed. In an aspect, the stored processor-executable software instructions may be configured to cause the processor to perform operations such that calculating a minimum time and a maximum time at which the software associated with the first subsystem should be restarted may include calculating the minimum time and the maximum time based on stored data describing at least one of previous subsystem software failures, subsystem software age information, dependency list subsystems identities, defect rates, and utilized resources of the first subsystem. In an aspect, the stored processor-executable software instructions may be configured to cause the processor to perform operations that may further include storing the calculated minimum time and the calculated maximum time within the mobile device, and the calculated minimum time and the calculated maximum time may be pre-determined based on historical data. In an aspect, the stored processor-executable software instructions may be configured to cause the processor to perform operations that may further include periodically retransmitting request messages to each dependent subsystem after the minimum time has elapsed so long as a dependent subsystem votes that the restart should not occur until the maximum time has elapsed. In an aspect, the stored processor-executable software instructions may be configured to cause the processor to perform operations that may further include calculating an interval for periodically retransmitting request messages to each dependent subsystem. In an aspect the stored processor-executable software instructions may be configured to cause the processor to perform operations that may further include decreasing the interval for periodically retransmitting request messages based on time remaining before the maximum time at which the software associated with the first subsystem should be restarted. In an aspect, the stored processor-executable software instructions may be configured to cause the processor to perform operations that may further include storing the calculated interval for periodically retransmitting request messages within the mobile device, and the interval for periodically retransmitting request messages may be pre-determined based on historical data.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "subsystem" is used herein to refer to a software module, operations, instructions, and/or routines executed by various components included within a system-on-chip of a mobile device. For example, a particular system-on-chip may include a microprocessor that executes a subsystem for performing video codec operations. As another example, a system-on-chip's multi-core processor may execute a subsystem for managing input and output data associated with a cellular network chip.

The various aspects include methods and devices for increasing the reliability of subsystems executing within mobile devices by restarting software associated with the subsystems prior to failure in a manner that minimizes disruptions to other subsystems. Specifically, mobile devices may increase reliability by increasing the Mean Time Between Failures. In general, as the operations of the subsystem are executed by the mobile device, the subsystem may experience software aging. For example, over time the memory available to the subsystem may decrease due to poor garbage collection policies implemented within the subsystem's software routines. As the subsystem continues to operate, the occurrence of a failure or crash of the subsystem may become increasingly likely. For example, as the subsystem software does not properly reallocate used memory over time, the subsystem may eventually fail due to memory unavailability. To avoid problems of software aging, one or more processors (or processor cores) within the mobile device may proactively employ software rejuvenation, a commonly-known mechanism for addressing software-related failures by periodically restarting software modules to decrease (or resetting) their "age," thereby minimizing adverse operating conditions due to software aging. Instead of simply restarting the entire mobile device, a processor within the mobile device or entire software systems, individual subsystems may be restarted based on ages selected to reduce the likelihood that this system will experience age-related software failures. Restarting a software or hardware/software subsystem may effectively resets any on-going issues related to software aging and the general operation of the subsystem, thereby reducing the likelihood of the subsystem failing due to software aging. To avoid impacting other functions executing on the mobile device, such subsystem software restarts are accomplished when a poll of dependent subsystems indicates that such a restart is acceptable (i.e., there are no dependent subsystems or any dependent subsystem can do without support from the restarting subsystem long enough to accomplish the restart). By initiating the restart of software associated with subsystems when that action will not impact the operations of dependent subsystems, the reliability of the mobile device may be increased with minimal impact on the user experience.

The term "dependent subsystems" is used herein to refer to subsystems that interact with or otherwise depend on the selected subsystem for their functionality. In general, subsystems may exchange data with and/or perform operations requested by other subsystems. In particular, a first subsystem may rely upon the data and/or operations of a second subsystem such that the first subsystem cannot operate properly without the second subsystem's execution and/or data. For example, the first subsystem may execute a function that utilizes input variables generated by the second subsystem. When a first subsystem requires data and/or operations from another subsystem, the first subsystem is referred to as being dependent upon the second subsystem. The term "dependency list" is used herein to refer to a list of subsystems that are dependent upon a particular subsystem. For example, the dependency list of a first subsystem may include all of the subsystems executing within a processor system (which may be a system-on-chip) of a mobile device, as well as other processors that utilize data and/or services produced by the first subsystem.

In various aspects, the mobile device, via an operating system mechanism and/or an individual subsystem, may identify a time window (referred to as a "restart time window") in which a selected subsystem's software may be restarted, rebooted, and/or rebuilt to avoid software failures due to software aging. For example, a hypervisor software module associated with the mobile device's operating system or the selected subsystem may determine the restart time window. The restart time window may be a period during which the selected subsystem's performance and/or reliability may be improved or maintained through software rejuvenation. The restart time window may be defined by a minimum restart time (i.e., the earliest time that a software restart would be beneficial) and a maximum restart time (i.e., a time after which the selected subsystem should be immediately restarted to avoid software aging problems). In an aspect, the determination of the restart time window for the selected subsystem may be scheduled as a periodic operation of the selected subsystem. For example, the selected subsystem may identify the minimum and maximum restart times when a software module is started, with those values based on the particular software that is executing. In another example, the selected subsystem may calculate the restart time window at predefined intervals (e.g., seconds, minutes, etc.). In another aspect, the restart time window (i.e., the minimum and maximum restart times) may be determined based on stored data describing previous age-related software failures, software age information (e.g., the date/time when the software module was last restarted), dependency list subsystems identities, defect rates, and utilized resources of the selected subsystem.

The selected subsystem may maintain a restart timer or variable to track the amount of consecutive execution time of a software module. The restart timer may indicate the length of time since the selected subsystem was first activated or was last restarted. During execution, the selected subsystem may compare the restart timer to the restart time window. As the risk of the selected subsystem failing may be very low when the mobile device is first activated, the selected subsystem may not need to restart while the restart timer represents a value less than the minimum restart time threshold of the restart time window. In other words, software aging may not be a concern when the restart timer is less than the minimum restart time.

When the restart timer exceeds the minimum restart time threshold, the selected subsystem may periodically poll other subsystems that utilize or interact with the selected subsystem, and thus are dependent subsystems, to determine whether any dependent subsystems object to a restart of the selected subsystem software. The selected subsystem may transmit restart request messages to dependent subsystems (i.e., those subsystems on the selected subsystem's dependency list), requesting acceptance of the selected subsystem's restart. Subsystems included in the dependency list are those subsystems that may be adversely affected if the selected subsystem restarts while the dependency list subsystems are using and/or expected resources from the selected subsystem. The dependency list subsystems may respond with an objection to the requested restart (i.e., a 'no' vote) if their current operations or data requirements would be disrupted by the restart. For example, a dependency list subsystem may vote against the restart when it determines data may be required from the selected (i.e., the requesting) subsystem in the near future. A dependency list subsystem may respond in favor of the restart (i.e., a 'yes' vote) when it determines that such a restart will not adversely affect its operations over a period of time long enough to complete the restart. For example, a dependency list subsystem that is in a stand by or idle mode (e.g., a subsystem not currently in use by the user) may vote in favor of the restart. As another example, although a dependency list subsystem may require data from the selected subsystem, the dependency list subsystem may vote in favor of the restart when the dependency list subsystem is configured to execute a wait operation and request the data when the selected subsystem completes restarting.

The selected subsystem may then execute or delay a software restart based upon the results of polling all of its dependent subsystems (i.e., polling of the subsystems on its dependency list). Thus, selected subsystem may commence a software restart when all polled subsystems vote in favor of the restart or none object. However, if there is an objection or vote against the restart by a polled subsystem (e.g., at least one of the dependency list subsystems votes against the restart), the selected subsystem may delay the restart and continue to periodically poll the dependency list subsystems. In an aspect, the rate of such periodic polling of the dependency list subsystems may depend upon the particular software module and may increase (i.e., polling may be accomplished more frequently) as the time before the maximum restart time diminishes. In an aspect, the selected subsystem may calculate the restart request rate that determines the frequency at which restart request messages may be transmitted to the dependency list subsystems.

If the restart timer exceeds the maximum restart time threshold (i.e., the software has aged for a maximum predefined period), the selected subsystem may stop polling dependency list subsystems and may preemptively initiate the restart of the selected subsystem software. For example, the selected subsystem may restart even when dependency list subsystems require services if the restart timer represents a time above the restart time window. While preemptively restarting the selected subsystem will impact the dependency list subsystems, and thus impact the mobile device behavior or performance, such disruptions is temporary (i.e., limited to the restart duration) and may be less disruptive than a software failure due to software aging.

In an aspect, the mobile device may incrementally modify the rate at which the selected subsystem polls the dependency list subsystems. For example, as the value of the restart timer approaches the maximum restart time, the selected subsystem may increase the restart request rate to increase the likelihood of finding all dependent subsystems in a state that can accommodate such a restart. As another example, the selected subsystem may decrease the restart request rate when a large number of dependency list subsystems vote against the restart, since under such operating conditions, the likelihood of a unanimous yes vote will be diminished. In another aspect, the restart request rate may be modified by the mobile device's operating system (e.g., a hypervisor routine) based on other parameters, such as time of day, day of week, user interactions with a user interface, etc.

In an aspect, the mobile device may employ protocols that enable subsystems to exchange messages, such as restart request messages and responses. Such protocols may also be used in combination with battery life conservation routines. For example, the mobile device may shutdown (or enter a sleep state) when subsystems report inactivity. However, the aspect methods use such communication protocols to enable voting by dependency list subsystems for the purpose of deciding when to restart a selected subsystem.

The aspect methods differ from conventional software rejuvenation methods because software restarts are not scheduled for certain times, based on user inputs, or performed in response to failures occurring since a subsystem's previous initialization. Additionally, the aspect methods may not transfer subsystem workloads to secondary systems (e.g., processors) and may not restart hardware. Instead, the various aspect methods preempt failures of a subsystem by restarting software based on a determined restart time window and voting by dependent subsystems.

Figure 1:
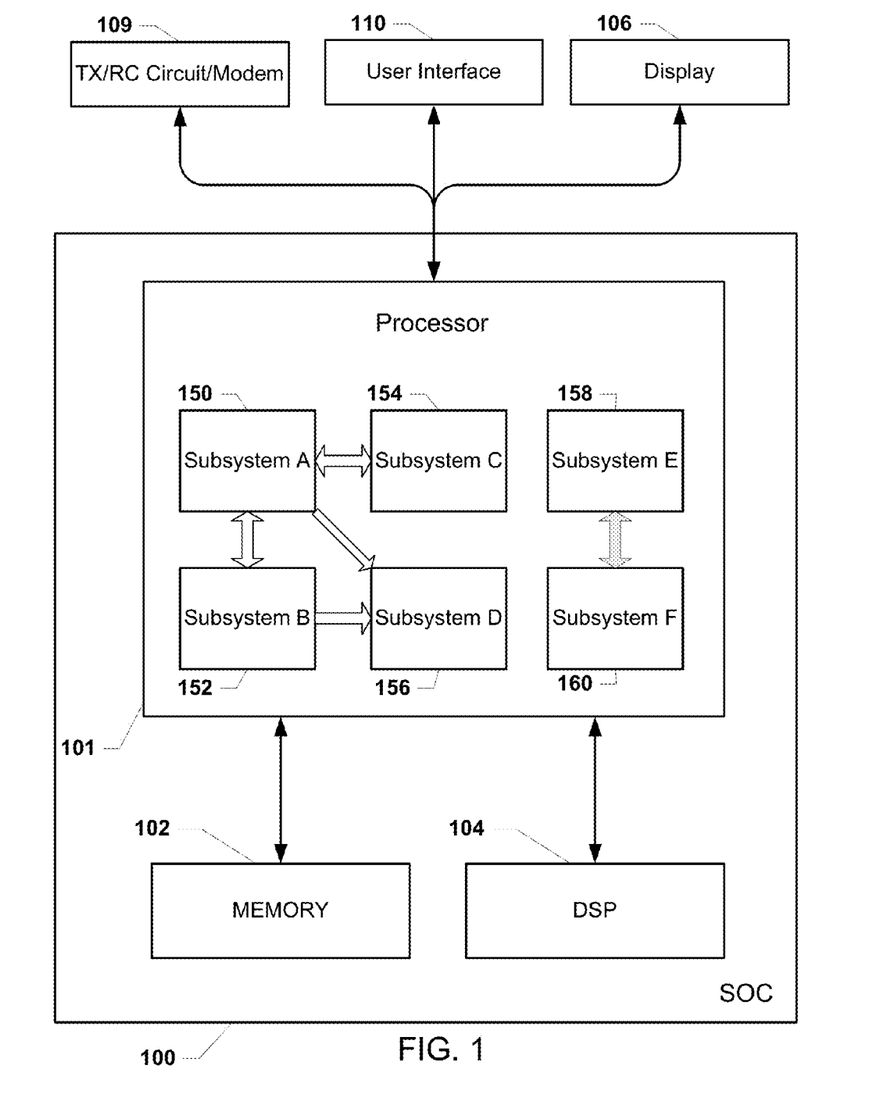
FIG. 1 is a component block diagram of a system-on-chip (SOC) executing numerous subsystems.

FIG. 1 illustrates a component block diagram of an example mobile device that includes a system-on-chip 100. A system-on-chip 100 may include numerous components, such as interfaces and various circuitry, a processor 101, such as a microprocessor or multi-core processor, a digital signal processor (DSP), and a memory 102. In an aspect, the system-on-chip 100 may include numerous processing units and memory that may work in combination with one another or individually for specific purposes. For example, the system-on-chip 100 may include the processor 101 for processing applications, such as an Internet browser application, and a digital signal processor 104 for processing radio frequency signals received from and provided to a transmitter/receiver (TX/RX) circuit or modem 109, such as a cellular network transceiver coupled to an antenna (not shown).

The processor 101 and memory 102 may be connected such that data may be transferred over a bus between the memory 102 and processor 101 during the execution of software, routines, and/or instructions within the processor 101. The system-on-chip 100 may also include various interfaces for exchanging data with external components within the mobile device, such as a communications TX/RX circuit/modem 109 (e.g., a cellular telephone, Bluetooth®, Zigbee®, Peanut®, or WiFi transceiver), a user interface 110, and a display 106 (e.g., an liquid crystal display or screen. The processor 101 may utilize data received from the memory 102 and/or the external components 109, 110, 106, to execute software instructions.

Each of the external components 109, 110, 106 may be subsystems that execute software modules and that depend on other subsystems. For example, a communications TX/RX circuit/modem 109 may include a modem processor executing software for controlling radio operations, executing communication protocols, and processing data for transmission and received by the radio. As such, external component subsystems may implement the various aspect methods to periodically restart their respective software modules and to vote on the restart of other subsystems on which they depend when polled.

The processor 101 may simultaneously execute numerous subsystems 150-160 as software modules which may execute on a single processor, or on two or more cores within a multicore processor. For example, subsystem 'A' 150 may be a software application, set of instructions, or otherwise a software module executing on the processor 101 at the same time subsystem 'B' 152 is also executing on the processor 101. As another example, subsystem 'C' 154 may be software that controls a video codec service on the mobile device, and the subsystem 'D' 156 may be software that monitors sensor activity within the mobile device (e.g., detects and evaluates real-time accelerometer sensor data). In various aspects, the subsystems 150-160 may be operating system threads or routines executing on the processor 101.

As described above, the various subsystems may exchange data and perform operations for other, dependent subsystems. Each subsystem, or a hypervisor supervising all or most subsystems, may maintain a dependency list that identifies each dependent subsystem.

As an illustration, in FIG. 1 subsystem 'A' 150 may provide data and/or perform operations for subsystem 'C' 154, subsystem 'B' 152, and subsystem 'D' 156. In this example, the dependency list for subsystem 'A' 150 may include subsystem 'B' 152, subsystem 'C' 154, and subsystem 'D' 156. The subsystem 'B' 152 may provide data and/or perform operations for subsystem 'A' 150 and subsystem 'D' 156. In other words, the dependency list for subsystem 'B' 152 may include subsystem 'A' 150 and subsystem 'D' 156. The subsystem 'C' 154 may provide data and/or perform operations for subsystem 'A' 150. In other words, the dependency list for subsystem 'C' 154 may only include subsystem 'A' 150. The subsystem 'D' 156 may not provide data and/or perform operations for any other subsystem and therefore may have an empty dependency list. The subsystem 'E' 158 and subsystem 'F' may provide data and/or perform operations for each other, and be unconnected and independent of the other subsystems 150-156 executing on the processor 101. In an aspect, the dependency lists for the various subsystems 150-160 may be dynamic and change as the various subsystems 150-160 are executed by the processor 101, or alternatively, may remain constant.

Figure 2:
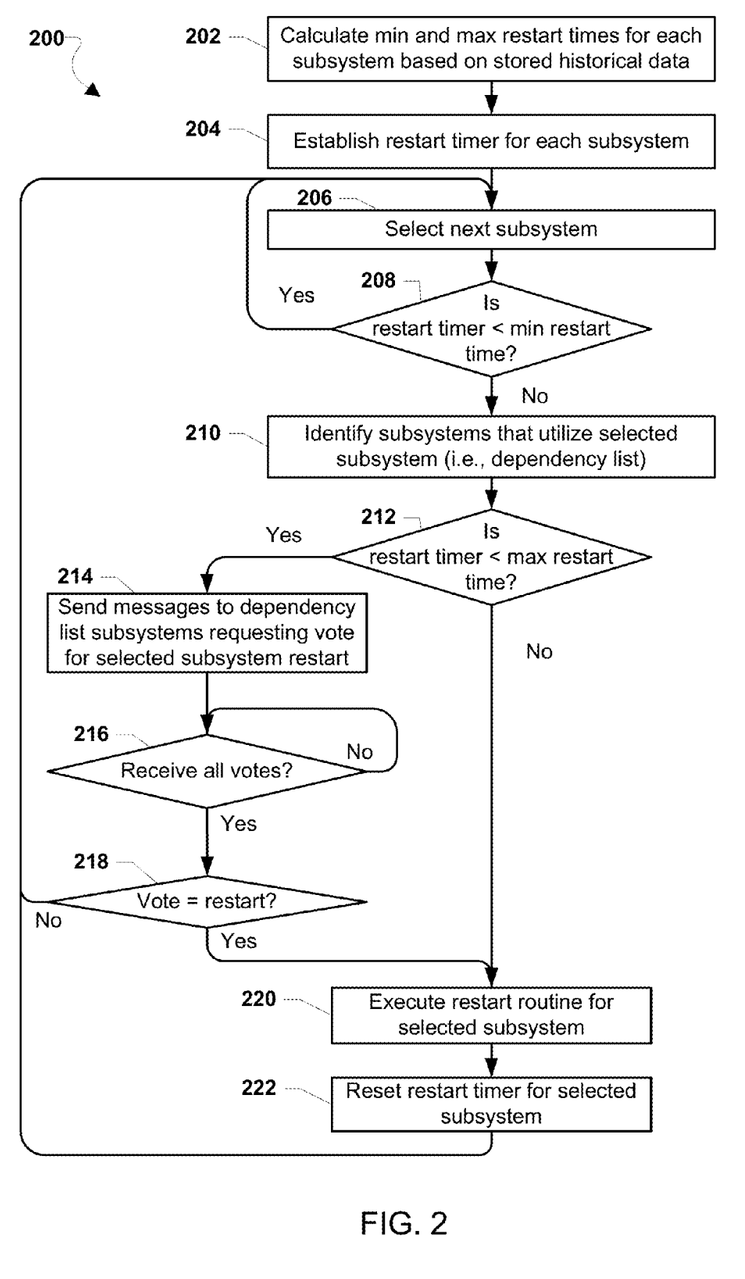
FIG. 2 is a process flow diagram illustrating an aspect method 200 for a mobile device resetting subsystems prior to failure based on calculated time windows and dependency list voting routines.

FIG. 2 illustrates an aspect method 200 for restarting a particular subsystem executing on a multi-subsystem mobile device to avoid failures from software aging. In block 202, the mobile device may calculate the minimum (referred to as 'min' in FIG. 2) and maximum (referred to as 'max' in FIG. 2) times at which a restart of the subsystem should be performed. For example, a subsystem's minimum restart time may be calculated as four hours and the subsystem's maximum restart time may be twenty hours. As described above, the minimum restart time and maximum restart time define a restart time window during which a corresponding subsystem may be restarted to preempt software failures. The mobile device may determine the minimum and maximum restart times based on historical, and/or current performance data describing the efficiency (or degradation) and failure of a subsystem over a period of time. In particular, the mobile device may calculate the minimum and maximum restart times for a subsystem based on data describing previous subsystem software failures, subsystem software age information, the identities of subsystems on a dependency list related to the subsystem, defect rates, and utilized resources of the subsystem. For example, a subsystem may store data representing the subsystem's performance over a predefined period, and may periodically calculate the minimum and maximum restart times based on the stored data. As another example, the mobile device may calculate the minimum restart time based on the subsystem's defect (or failure) rate over a period of time.

In an aspect, minimum and maximum restart times may represent real-time clock values and/or calendar dates. For example, the restart time window may be represented by a particular time in the morning and another time in the afternoon, and may reference the mobile device's system clock mechanism as a timer. In another aspect, the restart time window (and the minimum and maximum restart times) may be represented as elapsed time or processor clock cycles. For example, the minimum and maximum restart times may be numbers of clock cycles of the mobile device's processor. In other words, when a subsystem has been executed by the mobile device for a certain number of processor cycles, the subsystem may be restarted.

In an aspect, the minimum and maximum restart times may be calculated by the mobile device's operating system (e.g., operating system routines, threads, management software, etc.) or, alternatively, each subsystem may be configured to calculate its own minimum and maximum restart times. For example, each subsystem or a loader operating system routine may calculate corresponding minimum and maximum restart times upon instantiation of a software module or subsystem. In another aspect, the minimum and maximum restart times may be pre-calculated by a developer of the subsystem software based on known issues, historical data (e.g., testing or sampling data), and/or specifications of the mobile device. For example, the mobile device may utilize minimum and maximum restart times based on a particular subsystem's developer reported failure rate over a certain period of execution.

In an aspect, the minimum restart time and maximum restart time may be pre-determined based on historical data, and may be stored within a database or data store within the mobile device's operating system. For example, each subsystem and/or a related software module (e.g., a mobile device operating system thread) may read minimum and maximum restart time data from a stored database for comparison operations as described below.

Returning to FIG. 2, in block 204, the mobile device may establish a restart timer for each subsystem. As described above, the restart timer may be a variable that functions as a counter mechanism. For example, the mobile device may store an integer variable associated with a subsystem that may be incremented periodically based on the passage of time. In an aspect, the minimum and maximum restart times may be relative time values the subsystem may utilize in combination with the restart timer. For example, the subsystem may initialize the restart timer (e.g., set the restart timer to a zero value) and continually compare the timer variable to the minimum and maximum restart times to determine whether a restart is required. In an aspect, the restart timer may increment with the changes of the mobile device's system clock. For example, the restart timer may increment once for each time the system clock updates.

In block 206, a processor on the mobile device, such as via an operating system routine, may select a subsystem for evaluation. For example, the mobile device may maintain a list of all currently executing subsystems as well as a pointer to a next subsystem to be evaluated for a potential restart. Block 206 is optional, because in aspects in which individual subsystems may execute the method 200 with regards to their own restart routines, the operations in block 206 may be unnecessary. In determination block 208, the mobile device may determine whether the current value of the restart timer for the selected subsystem is less than the minimum restart time. In other words, a processor on the mobile device may determine whether the restart timer represents a time value within the restart time window. If the restart timer is less than the minimum restart time (i.e., determination block 208="Yes"), the mobile device processor may continue with the operations in block 206.

However, if the selected subsystem's restart timer is not less than the minimum restart time (i.e., determination block 208="No"), in block 210, the mobile device processor may identify all of the subsystems currently dependent upon the selected subsystem (i.e., the dependency list subsystems). For example, the mobile device may identify all subsystems executing on the mobile device that may communicate with, share resources with, or otherwise utilize the selected subsystem. In an aspect, the mobile device may evaluate software instructions being executed by the various subsystems of the mobile device to determine which subsystems employ the resources of the selected subsystem. For example, the mobile device may detect when functions native and/or exclusive to the selected subsystem are called or within the software instructions of the various other subsystems. As another example, the mobile device may detect when other subsystems may access memory locations allocated to the selected subsystem. In an aspect, the mobile device may maintain a data table indicating all dependencies between currently functioning subsystems. In another aspect, each subsystem may individually maintain data indicating dependencies and may be queried by the selected subsystem, the mobile device's operating system, and/or any other software executing within the mobile device. For example, the selected subsystem may determine dependency list subsystems by transmitting queries to and receiving confirmation (or denial) responses from all of the subsystems executing within the mobile device.

If the restart time is less than maximum restart time (i.e., determination block 212="Yes"), in block 214 the mobile device may transmit restart request messages to the dependency list subsystems of the selected subsystem, requesting a vote as to whether the selected subsystem may restart. For example, the restart request message may query whether the selected subsystem may restart at a particular time. The dependency list subsystems may respond with a 'yes' (i.e., accept the restart) or a 'no' (i.e., reject the restart) based on whether the subsystems are currently using, in communication with, and/or scheduling the future use of the selected subsystem's resources, operations, or data. For example, the dependency list subsystems may evaluate currently executing software instructions to determine whether the instructions depend upon input or operations from the selected subsystem. In an aspect, the restart request messages may include the selected subsystem's identity, restart timer value, previous failure information, and minimum and maximum times. For example, based on the maximum time value represented within a received restart request message, a dependency list subsystem may determine that its processes may be re-scheduled to enable the restart of the selected subsystem.

In determination block 216, the mobile device may determine whether a response (or vote) is received from each of the dependency list subsystems. If not all dependency list subsystems have responded (i.e., determination block 216="No"), the mobile device may continue to receive responses with the operations in determination block 216.

If all dependency list subsystems have responded (i.e., determination block 216="Yes"), the mobile device may determine whether the dependency list subsystems have unanimously voted in favor of the restart of the selected subsystem. If the vote is not unanimously in favor of a restart (i.e., determination block 218="No"), the mobile device may continue with the operations in block 206. For example, the selected subsystem may not be restarted when a dependency list subsystem is currently waiting on data from the selected subsystem.

However, if the vote is unanimous in favor of a restart (i.e., determination block 218="Yes") or if the restart time is equal to or greater than the maximum restart time (i.e., determination block 212="No"), in block 220 the mobile device may immediately execute restart routines for the selected subsystem. For example, the mobile device may proceed to restart, reboot, rebuild, or otherwise renew the software image of the selected subsystem. The restart operations are described further below with reference to FIG. 4. In block 222, the mobile device may reset the restart timer and continue with the operations in block 206.

Figure 3A:
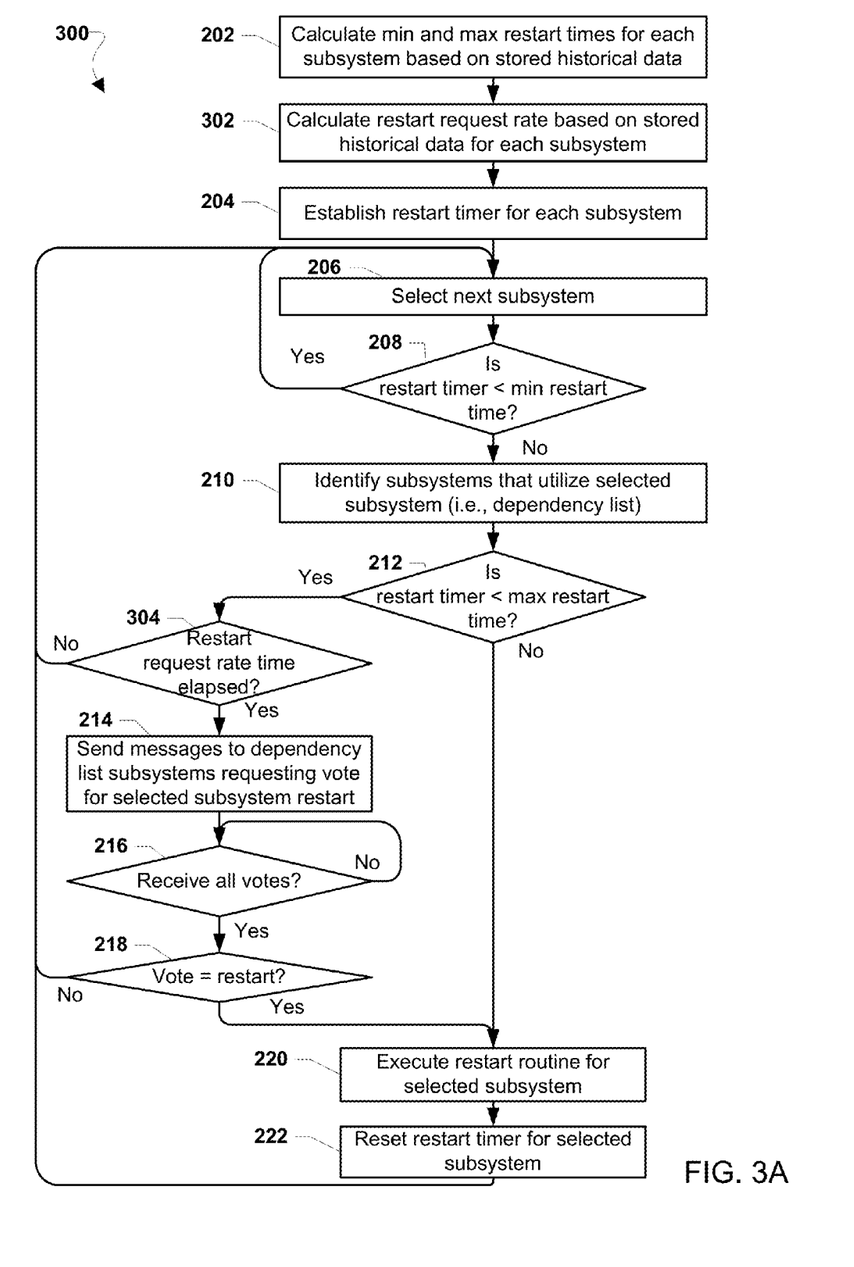
FIG. 3A is a process flow diagram illustrating an aspect method 300 for a mobile device determining whether to reset a subsystem based on a dependency list vote.

FIG. 3A illustrates another aspect method 300 for a mobile device restarting a subsystem using a restart request rate. The method 300 may be similar to the method 200 as described above, except the method 300 may also utilize a timing mechanism (or a "restart request rate") that defines a periodicity with which the mobile device may poll dependency list subsystems of a subsystem to be restarted. In other words, a selected subsystem may request dependency list subsystems to vote on a restart at a particular time interval. For example, the selected subsystem may transmit restart request messages to dependency list subsystems every few milliseconds based on the selected subsystem's maximum restart time.

As described above, in block 202, the mobile device may calculate (or access from a stored database) minimum and maximum times that define restart time windows for various subsystems. In block 302, the mobile device may calculate a restart request rate for each subsystem. In an aspect, the mobile device may calculate the restart request rate based on the same information (i.e., previous performance data) utilized in the operations in block 202 and block 204. For example, a subsystem's restart request rate may be calculated based on the average response time from previous inter-subsystem communications, the characteristics of previous recorded failures for the subsystem, and the previous number of concurrent dependency list subsystems. In another aspect, the restart request rate may be pre-determined based on historical data, and may be stored within a database or data store within the mobile device's operating system. For example, a mobile device operating system thread may read restart request rate data from a stored database for comparison operations as described below.

In block 204, the mobile device may establish a restart timer for each subsystem. In block 206, the mobile device may select a subsystem for evaluation. In determination block 208, the mobile device may determine whether the current value of the restart timer for the selected subsystem is less than the minimum restart time. If the restart timer is less than the minimum restart time (i.e., determination block 208="Yes"), the mobile device may return to block 206 to select the next subsystem. However, if the selected subsystem's restart timer is not less than the minimum restart time (i.e., determination block 208="No"), in block 210, the mobile device may identify the dependency list subsystems of the selected subsystem.

If the restart time is less than maximum restart time (i.e., determination block 212="Yes"), in determination block 304, the mobile device may determine whether to transmit request messages to the dependency list subsystems based on the selected subsystem's restart request rate. In an aspect, the mobile device may store and update a variable that indicates the time the selected subsystem last transmitted request messages to the dependency list subsystems. During the execution of the determination block 304 operations, the mobile device may calculate the next time when the selected subsystem may transmit the request messages by adding a time corresponding to the restart request rate (e.g., a number of milliseconds, seconds, etc.) to the stored variable and compare the combined value to the mobile device's system clock. When the combined value is greater or equal to the system clock, the mobile device may determine the time corresponding to the restart request rate has elapsed. If the time corresponding to the restart request rate has not elapsed (i.e., determination block 304="No"), the mobile device may continue with the operations in block 206.

If the time corresponding to the restart request rate has elapsed (i.e., determination block 304="Yes"), in block 214 the mobile device may transmit restart request messages to the dependency list subsystems of the selected subsystem, requesting responses (i.e., votes) as to whether the selected subsystem may be restarted. In determination block 216, the mobile device may determine whether a response (or vote) is received from each of the dependency list subsystems. If not all dependency list subsystems have responded (i.e., determination block 216="No"), the mobile device may continue to receive responses with the operations in determination block 216.

If all dependency list subsystems have responded (i.e., determination block 216="Yes"), the mobile device may determine whether the dependency list subsystems have all voted in favor of the restart of the selected subsystem. If the vote is not unanimous in favor of a restart (i.e., determination block 218="No"), the mobile device may continue with the operations in block 206. However, if the vote is unanimous in favor of a restart (i.e., determination block 218="Yes") or if the restart time is equal to or greater than the maximum restart time (i.e., determination block 212="No"), in block 220 the mobile device may immediately execute restart routines for the selected subsystem. In block 222, the mobile device may reset the restart timer for the selected subsystem and continue with the operations in block 206.

Figure 3B:
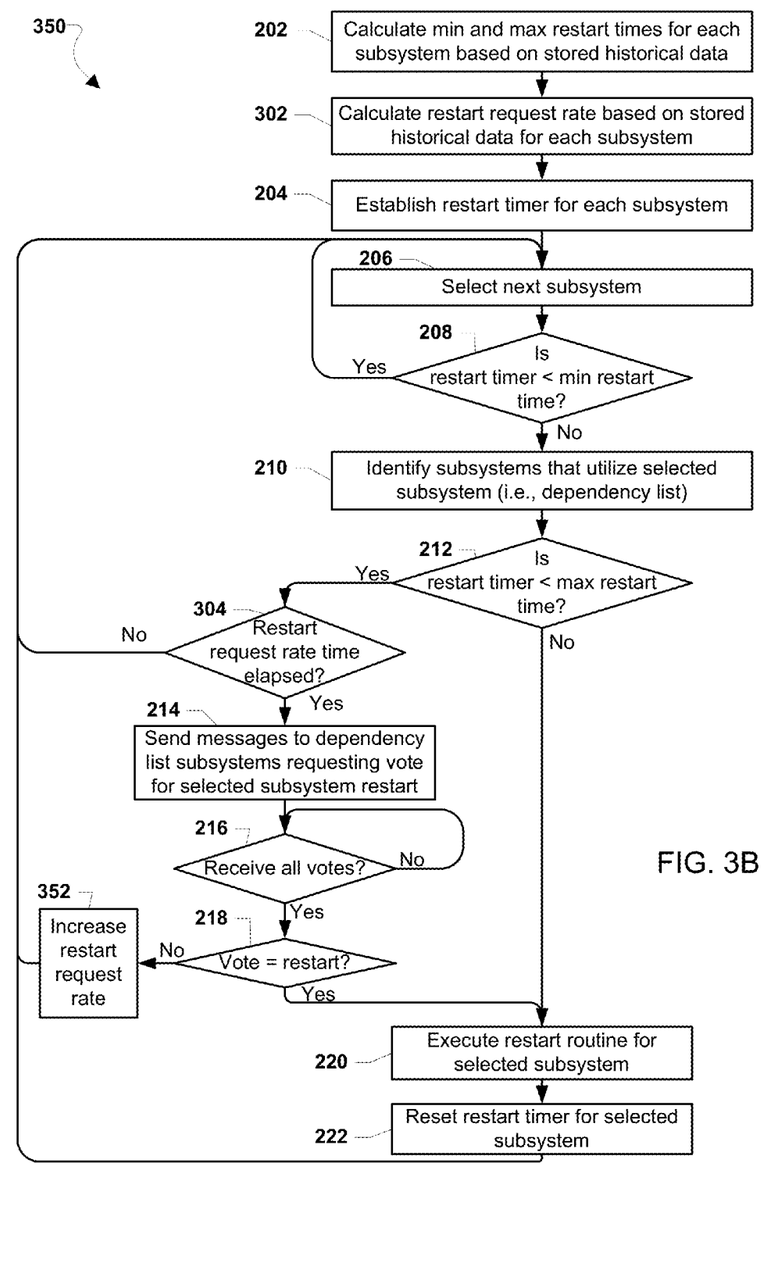
FIG. 3B a process flow diagram illustrating another aspect method 350 for a mobile device determining whether to reset a subsystem based on a dependency list vote that includes an increasing restart request rate.

FIG. 3B illustrates another aspect method 350 for a mobile device restarting a subsystem using a restart request rate. The method 350 is similar to the method 300, however the method 350 additionally adjusts a restart request rate with which the subsystem to be restarted polls other subsystems within a dependency list. For example, unlike the static restart request rate of method 300, the method 350 may employ a restart request rate that increases over time. Thus, as subsystems approach the end of their restart time windows, the frequency of transmission of restart requests messages may increase.

As described above, in block 202, the mobile device may calculate the minimum and maximum times in which a restart of the each subsystem should be performed. In block 302, the mobile device may calculate a restart request rate for each subsystem. In block 204, the mobile device may establish a restart timer for each subsystem. In block 206, the mobile device may select a subsystem for evaluation. In determination block 208, the mobile device may determine whether the current value of the restart timer for the selected subsystem is less than the selected subsystem's minimum restart time.

If the restart timer is less than the minimum restart time (i.e., determination block 208="Yes"), the mobile device may return to block 206 to select the next subsystem. However, if the selected subsystem's restart timer is not less than the minimum restart time (i.e., determination block 208="No"), in block 210, the mobile device may identify the subsystems dependent upon the selected subsystem (i.e., the dependency list subsystems). If the restart time is less than maximum restart time (i.e., determination block 212="Yes"), in determination block 304, the mobile device may determine whether to transmit request messages to the dependency list subsystems based on the selected subsystem's restart request rate. If a time corresponding to the restart request rate has not elapsed (i.e., determination block 304="No"), the mobile device may continue with the operations in block 206. If the time corresponding to the restart request rate has elapsed (i.e., determination block 304="Yes"), in block 214 the mobile device may transmit request messages to the subsystems of the selected subsystem's dependency list, requesting that the dependency list subsystems respond as to whether the selected subsystem may be restarted. In determination block 216, the mobile device may determine whether a response (or vote) is received from each of the subsystems of the selected subsystem's dependency list. If not all dependency list subsystems have responded (i.e., determination block 216="No"), the mobile device may continue to receive responses with the operations in determination block 216.

If all dependency list subsystems have responded (i.e., determination block 216="Yes"), the mobile device may determine whether the dependency list subsystems have all voted in favor of the restart of the selected subsystem. If the vote is not unanimous in favor of a restart (i.e., determination block 218="No"), in block 352, the mobile device may increase the restart request rate such that as the selected subsystem's restart timer approaches the end of the restart time window (i.e., the restart timer becomes closer to the maximum restart time), the mobile device may transmit restart request messages at a faster rate. In other words, before the restart time window expires and the selected subsystem is forcibly restarted, the mobile device may more frequently ask the dependent list subsystems to vote to accept the restart of the selected subsystem.

If the vote is unanimous in favor of a restart (i.e., determination block 218="Yes") or if the restart time is equal to or greater than the maximum restart time (i.e., determination block 212="No"), in block 220 the mobile device may immediately execute restart routines for the selected subsystem. In block 222, the mobile device may reset the restart timer for the selected subsystem and continue with the operations in block 206.

Figure 4:
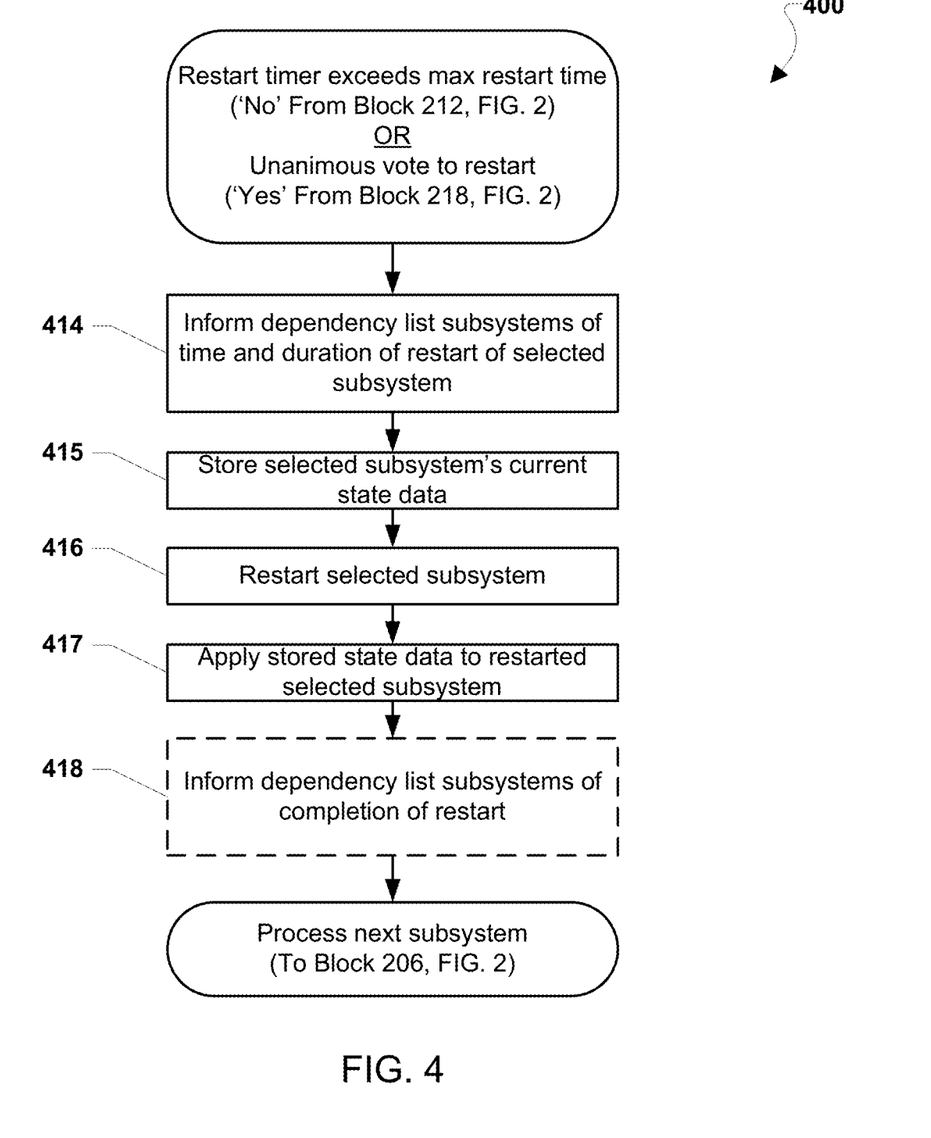
FIG. 4 is a process flow diagram illustrating an aspect method 400 for a mobile device resetting a subsystem.

FIG. 4 illustrates an aspect method 400 for a mobile device restarting a selected subsystem based on a unanimous dependency list subsystem vote or a lapsed restart time window. As described above, the mobile device may execute restart, reboot, and/or rebuild operations for the selected subsystem to avoid adverse conditions of software aging. However, to maintain an acceptable user experience as well as consistency of operation of the various dependency list subsystems, the mobile device may communicate with dependency list subsystems and preserve data of the restarting subsystem. For example, the selected subsystem may transmit warning messages to dependency list subsystems advising these subsystems to prepare for the selected subsystem's unavailability during the restart. As another example, the mobile device may configure the restarted selected subsystem to operate in a state, configuration, and/or mode that the selected subsystem utilized prior to the restart. As stated above, the operations of method 400 may be executed by the mobile device, via operating system routines and/or subsystems (e.g., the selected subsystem being restarted). Additionally, the method 400 may be performed in place of the operations in block 220 described above with reference to FIG. 2.

In block 414, the mobile device may inform the selected subsystem's dependency list subsystems that a restart of the selected subsystem will occur, and indicate the time and duration of the impending software restart. For example, the subsystem may transmit signals (e.g., interrupts) to each of the dependency list subsystems that include a counter indicating the period until the selected subsystem restarts. In an aspect, the mobile device may maintain a data table that includes scheduled restart information for various subsystems and that may be queried by dependency list subsystems. For example, the various subsystems of the mobile device may periodically check the data table to identify whether there are scheduled restarts that may affect the operations of the subsystems.

In various aspects, based on received messages, interrupts, or other communications regarding the scheduled restart, the dependency list subsystems may evaluate pending operations, scheduled procedures, and any other routines the dependency list subsystems scheduled to execute within the selected subsystem's restart duration. For example, a dependency list subsystem may compare the reported restart duration of the selected subsystem to scheduled operations and identify any operations that depend upon the selected subsystem. In other words, the dependency list subsystems may identify conflicts based on the reported restart duration. When conflicts are identified, the dependency list subsystems may wait for a period, cancel the conflicting operations, and/or reschedule the conflicting operations.

In block 415, the mobile device may store state information of the selected subsystem to enable an efficient (or faster) restart process and to avoid losing any significant configuration or use data. For example, the mobile device may store data defining the current state of the selected subsystem in non-volatile memory. In block 416, the mobile device may restart the software image of the selected subsystem. For example, the selected subsystem may discontinue any active operations, reset all variables to represent default values, and discard any cached input/output data. In an aspect, the selected subsystem may execute a restart routine or operation that initializes the selected subsystem's variables and interfaces.

In block 417, the mobile device may apply, load, or otherwise utilize the data stored in operations in block 415 and may restore the selected subsystem to the operating state and/or configuration enabled before restarting. For example, the selected subsystem may reload a user preference file to configure the selected subsystem to utilize certain weighting when processing data sets. In optional block 418, the mobile device may inform the dependency list subsystems that the software restart is complete, and that the selected subsystem is available for use and/or communication. The mobile device may then continue with the operations in block 206 described above with reference to FIG. 2, wherein a next subsystem may be selected.

In various aspects, any of the subsystems executing on the mobile device may perform the aspect methods 200, 300, 350, and 400 described above with reference to FIGS. 2, 3A, 3B, and 4, respectively. For example, a subsystem executing the method 200 may calculate and evaluate its own relevant data (e.g., minimum and maximum restart times, dependency lists, etc.). In other words, the various methods 200, 300, 350, and 400 may be performed in a de-centralized manner on a subsystem-by-subsystem basis. Thus, selection operations, such as described above with reference to block 206, as well as operations referring to the calculation of data for multiple subsystems, may be merely for illustrative purposes and/or aspects in which the mobile device may perform certain operations for all subsystems. For example, an operating system routine executing on the mobile device may perform the calculation operations in blocks 202-204 described above with reference to FIG. 2, and individual subsystems may be configured to perform the operations in blocks 208-222. In an aspect, the operations of the aspect methods 200, 300, 350, and 400 may be performed by individual subsystems, exclusively or in combination with other software executing on the mobile device.

Figure 5:
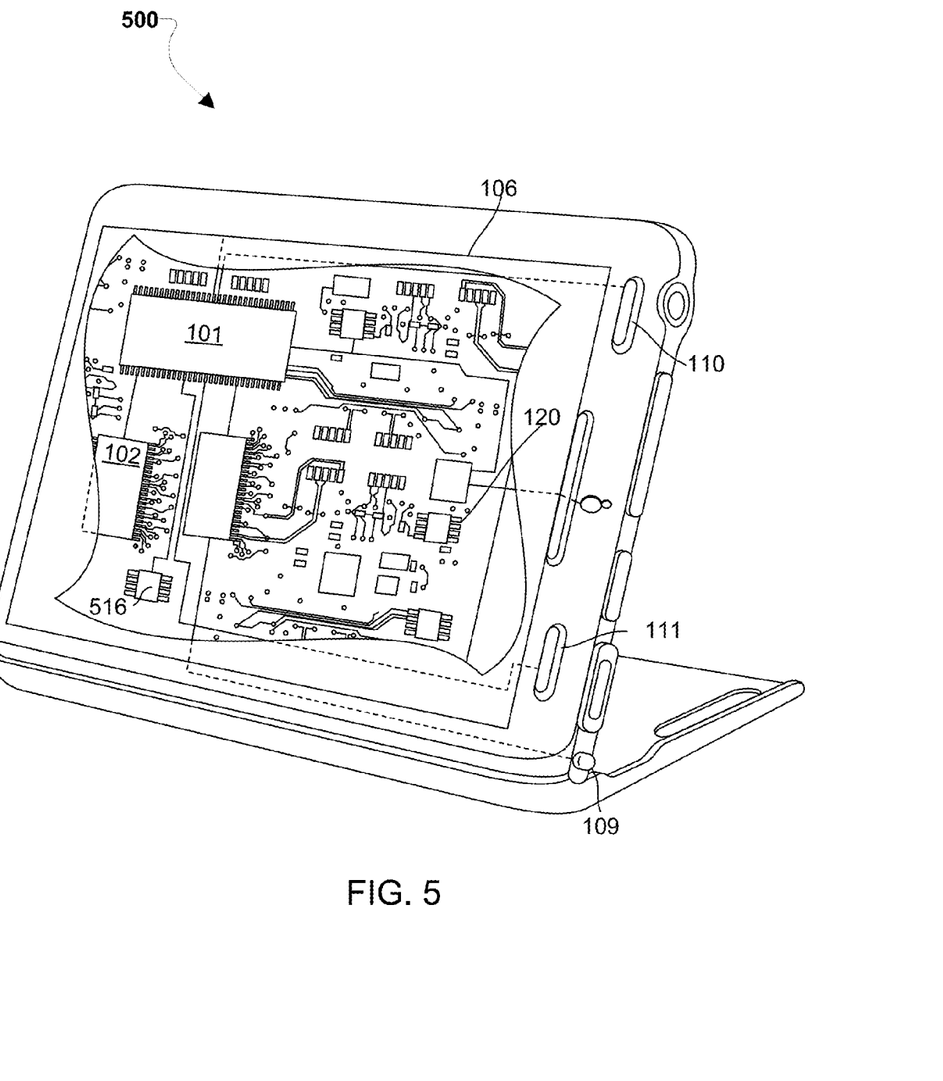
FIG. 5 is a component block diagram of an example wireless mobile device suitable for use with the various aspects.

The various aspects may be implemented in any of a variety of mobile devices (e.g., smartphones, feature phones, etc.), an example of which is illustrated in FIG. 5. For example, the mobile device 500 may include a processor 101 coupled to internal memory 102. The internal memory 102 may be volatile or non-volatile memory, and may also be secure and/or encrypted memory, or unsecure and/or unencrypted memory, or any combination thereof. In various aspects, the mobile device 500 may arrange the various components (e.g., processor 101, memory 102, etc.) in a system-on-chip design layout as described above. The processor 101 may also be coupled to a touch screen display 106, such as a resistive-sensing touch screen, capacitive-sensing touch screen infrared sensing touch screen, etc. Additionally, the display 106 of the mobile device 500 need not have touch screen capability. The mobile device 500 may have one or more short-range radio signal transceivers 516 (e.g., Peanut, Bluetooth®, Zigbee®, RF radio) and antennas 109 for sending and receiving wireless signals as described herein. The transceivers 516 and antennas 109 may be used with the above-mentioned circuitry to implement the various wireless transmission protocol stacks/interfaces. The mobile device 500 may include a cellular network wireless modem chip 120 that enables communication via a cellular network. The mobile device 500 may also include physical buttons 110 and 111 for receiving user inputs.

The processor 101 may be any programmable microprocessor, microcomputer or multiple processor chip or chips that can be configured by software instructions (i.e., applications) to perform a variety of functions, including the functions of the various aspects described above. In some devices, multiple processors may be provided, such as one processor dedicated to wireless communication functions and one processor dedicated to running other applications. Typically, software applications may be stored in the internal memory 102 before they are accessed and loaded into the processor 101. The processor 101 may include internal memory sufficient to store the application software instructions. In many devices the internal memory may be a volatile or nonvolatile memory, such as flash memory, or a mixture of both. For the purposes of this description, a general reference to memory refers to memory accessible by the processor 101 including internal memory or removable memory plugged into the device and memory within the processor 101.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (digital signal processor), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a digital signal processor and a microprocessor, a plurality of microprocessors, one or more microprocessors in conjunction with a digital signal processor core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for improving reliability of a first subsystem executing on a multi-subsystem mobile device, comprising:
   calculating a minimum time and a maximum time at which software associated with the first subsystem should be restarted, wherein the minimum time corresponds to an amount of execution time of the first subsystem;
   identifying other subsystems that are dependent on the first subsystem;
   transmitting request messages to each dependent subsystem after the minimum time has elapsed and before the maximum time has elapsed, wherein the request messages prompt each dependent subsystem to vote on whether a restart of the software associated with the first subsystem may occur;
   restarting the software associated with the first subsystem when each dependent subsystem votes that the restart may occur; and
   restarting the software associated with the first subsystem when the maximum time at which the software associated with the first subsystem should be restarted has elapsed.

2. The method of claim 1, further comprising:
   informing each dependent subsystem of a time and a duration of the restart of the software associated with the first subsystem; and
   informing each dependent subsystem when restarting the software associated with the first subsystem has completed.

3. The method of claim 1, wherein calculating a minimum time and a maximum time at which the software associated with the first subsystem should be restarted comprises calculating the minimum time and the maximum time based on stored data describing at least one of previous subsystem software failures, subsystem software age information, dependency list subsystems identities, defect rates, and utilized resources of the first subsystem.

4. The method of claim 1, further comprising storing the calculated minimum time and the calculated maximum time within the mobile device, and
    wherein the calculated minimum time and the calculated maximum time are pre-determined based on historical data.

5. The method of claim 1, further comprising:
    periodically retransmitting request messages to each dependent subsystem after the minimum time has elapsed so long as a dependent subsystem votes that the restart should not occur until the maximum time has elapsed.

6. The method of claim 5, further comprising calculating an interval for periodically retransmitting request messages to each dependent subsystem.

7. The method of claim 6, further comprising decreasing the interval for periodically retransmitting request messages based on time remaining before the maximum time at which the software associated with the first subsystem should be restarted.

8. The method of claim 6, further comprising storing the calculated interval for periodically retransmitting request messages within the mobile device,
    wherein the interval for periodically retransmitting request messages is pre-determined based on historical data.

9. A mobile device, comprising:
    means for calculating a minimum time and a maximum time at which software associated with a first subsystem should be restarted wherein the minimum time corresponds to an amount of execution time of the first subsystem;
    means for identifying other subsystems that are dependent on the first subsystem;
    means for transmitting request messages to each dependent subsystem after the minimum time has elapsed and before the maximum time has elapsed, wherein the request messages prompt each dependent subsystem to vote on whether a restart of the software associated with the first subsystem may occur;
    means for restarting the software associated with the first subsystem when each dependent subsystem votes that the restart may occur; and
    means for restarting the software associated with the first subsystem when the maximum time at which the software associated with the first subsystem should be restarted has elapsed.

10. The mobile device of claim 9, further comprising:
    means for informing each dependent subsystem of a time and a duration of the restart of the software associated with the first subsystem; and
    means for informing each dependent subsystem when restarting the software associated with the first subsystem has completed.

11. The mobile device of claim 9, wherein means for calculating a minimum time and a maximum time at which the software associated with the first subsystem should be restarted comprises means for calculating the minimum time and the maximum time based on stored data describing at least one of previous subsystem software failures, subsystem software age information, dependency list subsystems identities, defect rates, and utilized resources of the first subsystem.

12. The mobile device of claim 9, further comprising means for storing the calculated minimum time and the calculated maximum time within the mobile device, and
    wherein the calculated minimum time and the calculated maximum time are pre-determined based on historical data.

13. The mobile device of claim 9, further comprising:
    means for periodically retransmitting request messages to each dependent subsystem after the minimum time has elapsed so long as a dependent subsystem votes that the restart should not occur until the maximum time has elapsed.

14. The mobile device of claim 13, further comprising means for calculating an interval for periodically retransmitting request messages to each dependent subsystem.

15. The mobile device of claim 14, further comprising means for decreasing the interval for periodically retransmitting request messages based on time remaining before the maximum time at which the software associated with the first subsystem should be restarted.

16. The mobile device of claim 14, further comprising means for storing the calculated interval for periodically retransmitting request messages within the mobile device, and
    wherein the interval for periodically retransmitting request messages is pre-determined based on historical data.

17. A multi-subsystem mobile device, comprising:
    a memory; and
    a processor coupled to the memory, wherein the processor is configured with processor-executable instructions to perform operations comprising:
        calculating a minimum time and a maximum time at which software associated with a first subsystem should be restarted, wherein the minimum time corresponds to an amount of execution time of the first subsystem;
        identifying other subsystems that are dependent on the first subsystem;
        transmitting request messages to each dependent subsystem after the minimum time has elapsed and before the maximum time has elapsed, wherein the request messages prompt each dependent subsystem to vote on whether a restart of the software associated with the first subsystem may occur;
        restarting the software associated with the first subsystem when each dependent subsystem votes that the restart may occur; and
        restarting the software associated with the first subsystem when the maximum time at which the software associated with the first subsystem should be restarted has elapsed.

18. The mobile device of claim 17, wherein the processor is configured with processor-executable instructions to perform operations further comprising:
    informing each dependent subsystem of a time and a duration of the restart of the software associated with the first subsystem; and
    informing each dependent subsystem when restarting the software associated with the first subsystem has completed.

19. The mobile device of claim 17, wherein the processor is configured with processor-executable instructions to perform operations such that calculating a minimum time and a maximum time at which the software associated with the first subsystem should be restarted comprises calculating the minimum time and the maximum time based on stored data describing at least one of previous subsystem software failures, subsystem software age information, dependency list subsystems identities, defect rates, and utilized resources of the first subsystem.

20. The mobile device of claim 17, wherein the processor is configured with processor-executable instructions to perform operations further comprising storing the calculated minimum time and the calculated maximum time within the mobile device, and
wherein the calculated minimum time and the calculated maximum time are pre-determined based on historical data.

21. The mobile device of claim 17, wherein the processor is configured with processor-executable instructions to perform operations further comprising:
periodically retransmitting request messages to each dependent subsystem after the minimum time has elapsed so long as a dependent subsystem votes that the restart should not occur until the maximum time has elapsed.

22. The mobile device of claim 21, wherein the processor is configured with processor-executable instructions to perform operations further comprising calculating an interval for periodically retransmitting request messages to each dependent subsystem.

23. The mobile device of claim 22, wherein the processor is configured with processor-executable instructions to perform operations further comprising decreasing the interval for periodically retransmitting request messages based on time remaining before the maximum time at which the software associated with the first subsystem should be restarted.

24. The mobile device of claim 22, wherein the processor is configured with processor-executable instructions to perform operations further comprising storing the calculated interval for periodically retransmitting request messages within the mobile device, and
wherein the interval for periodically retransmitting request messages is pre-determined based on historical data.

25. A non-transitory processor-readable storage medium having stored thereon processor-executable software instructions configured to cause a processor to perform operations for improving reliability of a first subsystem executing on a multi-subsystem mobile device, the operations comprising:
calculating a minimum time and a maximum time at which software associated with the first subsystem should be restarted, wherein the minimum time corresponds to an amount of execution time of the first subsystem;
identifying other subsystems that are dependent on the first subsystem;
transmitting request messages to each dependent subsystem after the minimum time has elapsed and before the maximum time has elapsed, wherein the request messages prompt each dependent subsystem to vote on whether a restart of the software associated with the first subsystem may occur;
restarting the software associated with the first subsystem when each dependent subsystem votes that the restart may occur; and
restarting the software associated with the first subsystem when the maximum time at which the software associated with the first subsystem should be restarted has elapsed.

26. The non-transitory processor-readable storage medium of claim 25, wherein the stored processor-executable software instructions are configured to cause the processor to perform operations further comprising:
informing each dependent subsystem of a time and a duration of the restart of the software associated with the first subsystem; and
informing each dependent subsystem when restarting the software associated with the first subsystem has completed.

27. The non-transitory processor-readable storage medium of claim 25, wherein the stored processor-executable software instructions are configured to cause the processor to perform operations such that calculating a minimum time and a maximum time at which the software associated with the first subsystem should be restarted comprises calculating the minimum time and the maximum time based on stored data describing at least one of previous subsystem software failures, subsystem software age information, dependency list subsystems identities, defect rates, and utilized resources of the first subsystem.

28. The non-transitory processor-readable storage medium of claim 25, wherein the stored processor-executable software instructions are configured to cause the processor to perform operations further comprising storing the calculated minimum time and the calculated maximum time within the mobile device, and
wherein the calculated minimum time and the calculated maximum time are pre-determined based on historical data.

29. The non-transitory processor-readable storage medium of claim 25, wherein the stored processor-executable software instructions are configured to cause the processor to perform operations further comprising:
periodically retransmitting request messages to each dependent subsystem after the minimum time has elapsed so long as a dependent subsystem votes that the restart should not occur until the maximum time has elapsed.

30. The non-transitory processor-readable storage medium of claim 29, wherein the stored processor-executable software instructions are configured to cause the processor to perform operations further comprising calculating an interval for periodically retransmitting request messages to each dependent subsystem.

31. The non-transitory processor-readable storage medium of claim 30, wherein the stored processor-executable software instructions are configured to cause the processor to perform operations further comprising decreasing the interval for periodically retransmitting request messages based on time remaining before the maximum time at which the software associated with the first subsystem should be restarted.

32. The non-transitory processor-readable storage medium of claim 30, wherein the stored processor-executable software instructions are configured to cause the processor to perform operations further comprising storing the calculated interval for periodically retransmitting request messages within the mobile device, and
wherein the interval for periodically retransmitting request messages is pre-determined based on historical data.

* * * * *